United States Patent
Forlani et al.

(10) Patent No.: US 9,733,838 B2
(45) Date of Patent: Aug. 15, 2017

(54) DEVICE AND METHOD OF INTERFACE BETWEEN DEVICES OR INPUT/OUTPUT PERIPHERALS AND ELECTRONIC COMPUTERS

(71) Applicant: PRB S.r.l., Milan (IT)

(72) Inventors: Paolo Forlani, Milan (IT); Antonio Carbonera, Milan (IT); Roberto Garavaglia, Milan (IT)

(73) Assignee: HERMES-COMM S.R.L.S., Milan (IT)

( * ) Notice: Subject to any disclaimer, the term of this patent is extended or adjusted under 35 U.S.C. 154(b) by 232 days.

(21) Appl. No.: 14/513,422

(22) Filed: Oct. 14, 2014

(65) Prior Publication Data
US 2015/0309727 A1    Oct. 29, 2015

(30) Foreign Application Priority Data
Apr. 23, 2014 (IT) .............................. RM2014A0207

(51) Int. Cl.
    *G06F 3/01*       (2006.01)
    *G06F 3/06*       (2006.01)

(52) U.S. Cl.
CPC ............ *G06F 3/061* (2013.01); *G06F 3/0605* (2013.01); *G06F 3/0659* (2013.01); *G06F 3/0661* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,725,628 B1 | 5/2010 | Phan et al. | |
| 7,827,258 B1 | 11/2010 | Kalbarga | |
| 8,832,289 B2* | 9/2014 | Mocanu ................... | G06F 1/00 709/230 |
| 2004/0054836 A1 | 3/2004 | Lai et al. | |
| 2007/0174534 A1 | 7/2007 | Wurzburg et al. | |

FOREIGN PATENT DOCUMENTS

WO      2012150267 A1     11/2012

OTHER PUBLICATIONS

Italian Search Report, dated Sep. 17, 2014, from corresponding IT application.

* cited by examiner

*Primary Examiner* — Cheng-Yuan Tseng
(74) *Attorney, Agent, or Firm* — Young & Thompson

(57) ABSTRACT

An electronic device (100) of interface between input/output peripherals (200) or devices and an electronic computer (300), the device being configured for allowing the receiving/transmitting of data and/or commands between at least an input/output peripheral (200) or device and at least an electronic computer (300) and including inside it at least one memory (105) including a writable portion wherein it is possible to store a plurality of commands to be transmitted from the electronic computer (300) to the input/output peripheral (200) and a plurality of data transmitted from the input/output peripheral (200) towards the electronic computer; the electronic device (100) presenting itself to the electronic computer (300) as a mass storage peripheral and being configured for allowing the interface of the at least one device or input/output peripheral (200) to the electronic computer (300) without the need of preventive installation of software driver on the electronic computer (300).

13 Claims, 4 Drawing Sheets

DEVICE AND METHOD OF INTERFACE BETWEEN DEVICES OR INPUT/OUTPUT PERIPHERALS AND ELECTRONIC COMPUTERS

FIELD OF THE TECHNIQUE

The present invention refers to the field of the systems of interface from and towards electronic computers and in detail concerns an interface device between input/output peripherals or devices and an electronic computer. The present invention further concerns a method of interface between input/output devices and electronic computers.

BACKGROUND ART

Both in the field of the consumer electronics, and in the industrial field, is known a great quantity of input/output devices capable to interface with electronic computers.

It is further known that today not only the traditional personal computers are the those which are capable to connect with input/output devices. With the arrival of the new generation of cellphones, portable computers, tablet PC, the user has available a great an heterogeneous typology of electronic computers (intended, according to the present description, as those electronic devices provided with at least a microprocessor configurable to be capable of receiving/transmitting signal and/or command data from and an input/output device connected to the electronic computer itself); all these data processors are capable to interface themselves with industrial or commercial input/output devices.

Due to this great quantity of types of electronic computers, the various input/output devices shall be designed to dialogue with a same great variety of operating systems, typically incompatible one with the other, like for example Windows XP, 7, 8, MacOS, Linux, Unix, Android or others.

The "compatibility" between an input/output device and an electronic computer is guaranteed by a computer software, technically said driver, capable to realize an interface between the real commands imparted to/from the input/output device from/towards the electronic computer.

The development, and the testing (alpha, beta testing, performance testing) of the drivers for all the operative systems which are present on the market causes a considerable slowing down of the introduction of the input/output devices on the market. In fact, even if exist some types of input/output devices wherein the non-perfect efficiency of a driver can be somewhat tolerated or tolerable, especially in the industrial field, and further less in the medical or financial sector, input/output devices with drivers which are not perfectly tested absolutely cannot be introduced on the market.

Furthermore, exists a great quantity of operating systems or their versions which are obsolete, but yet used. In particular, for the niche sectors, like for example the control systems of big industrial apparatuses, or for the control of banking electronic instruments, people still yet entrusts to electronic computers provided with operating systems sometimes really ancient, and this is because the obsolete operating system is easy to manage, for sure more tested during the time with respect to a new one, and due to the evolution required by hardware resources, often does not require imposing technical features. It is not rare, for example, to see electronic computers in the industrial field that still operate with operating systems like Windows 95, or XP. Discarding the realization of drivers for those operating systems, for the producer of the input/output device means cutting a significant part of the market.

Nevertheless, the software driver installation on a personal computer or more in general on an electronic computer requires the use of authorization criteria like system administrator, or anyway authorizations for modifying software on the operating system of the electronic computer that not always the user possesses. This, where it is necessary to use new software driver for interfacing to an input/output peripheral, causes the need of intervention of a technician, system manager or administrator with administrator access rights. Time and costs respectively become longer and more expensive.

Furthermore, the applicative software that are run on the computer shall be able to recognize the driver of the different devices and to connect to them in a specific way for each different existing driver; this implies a waste of time during the software programs development and testing and also a risks of scarce reliability, in particular during the phase of recognizing. Another problem rests in that many programming languages and development environments, it is not even possible to access to drivers that realize input/output functions, or it is possible only with complex low level function calls in the operating system.

The scope of the present invention is therefore to describe an interface device between input/output devices and an electronic computer that solves the aforementioned drawbacks.

In the same way, it is a scope of the present invention to describe a method of interface between input/output devices and an electronic computer that allows to solve the aforementioned drawbacks.

SUMMARY OF THE INVENTION

According to the present invention it is realized an electronic device of interface between input/output peripherals or devices and an electronic computer, the device being configured for allowing the receiving/transmitting of data and/or commands between at least one device or input/output peripheral and at least one electronic computer and comprising inside it at least one memory comprising a writable portion wherein it is possible to store, on at least one file which is shared with said device or input/output peripheral, a plurality of commands to transmit from said electronic computer to said input/output peripheral and a plurality of data transmitted from said input/output peripheral towards said electronic computer; said electronic device presenting itself to said electronic computer as a mass memory storage peripheral and being configured for allowing the interface of at least one device or input/output peripheral to said electronic computer without the need of a preventive specific software driver installation on said electronic computer.

Advantageously, said device comprises an interface which is susceptible to present to said electronic computer at least one virtual disk on/from which said electronic computer can write/read data; said at least one virtual disk containing said at least one file.

Advantageously said device comprises at least one first memory or memory portion of a writable type and a second memory or memory portion of a non-writable type and being different from said first memory or from said first memory portion; said first memory or memory portion realizing a means susceptible of containing in one or more files, said commands and/or said data transmitted from said input/output peripheral to said electronic computer; said second memory or memory portion comprising at least an interface stage of MSD type and a management stage of the file allocation table.

In detail, said first memory or memory portion correspond to said at least one virtual disk.

In particular, said first memory is a Flash memory or a RAM type memory.

Advantageously, on the device which is object of the present invention said at least one file that is in use opened in sharing with at least one between said electronic computer and said input/output device with a non-exclusive reading and writing mode which is susceptible to allow at least its writing from two different devices without preventive closure.

According to the present invention is further realized a method of interfacing between an electronic computer and a device or input/output peripheral; said method being characterized in that it comprises at least one step of interposition—on the communication channel created between said electronic computer and said device or input/output peripheral—of an electronic device of interface, comprising a virtual disk in turn comprising at least a first memory or memory portion in turn comprising at least a file which is accessible in writing both to said electronic computer and to said device or input/output peripheral; and wherein at the moment or following the connection with said electronic computer, said device presents itself to said electronic computer as a mass memory device; said method comprising a step of writing of at least one command for said device or input/output peripheral on said first memory or first memory portion which is accessible in writing.

Advantageously, said method further comprises a step of subdivision of said first memory or memory portion in a first and a second area which are respectively separated and targeted respectively to store at least temporarily commands which are transmitted from said electronic computer towards said device or input/output peripheral and to store at least temporarily responses which are transmitted from said device or input/output peripheral to said electronic computer.

Advantageously, said method also comprises a step of subdivision of said first memory or first memory portion in at least a first area targeted to the writing of commands by said electronic computer towards said device or input/output peripheral and a second area targeted to the writing of responses by said device or input/output peripheral towards said electronic computer; said method comprising a subdivision of said first area in a plurality of bytes each one representing a plurality of parallel input/outputs for commands to be set on said device or input/output peripheral.

Advantageously, said first memory or first memory portion is managed as a FIFO queue.

Advantageously, said FIFO queue realizes a serial-type interface.

The method according to the present invention further comprises a step of assigning a predetermined name to said at least one file, said predetermined name being known by said input/output device; said method comprising a step of research from said input/output device of said file with said predetermined name at the moment or following the connection with said device.

Advantageously, the method according to the present invention comprises a step of opening by said electronic computer of said at least one file without caching; said opening of the file without caching by said electronic computer causing an immediate updated representation of said file to said electronic computer following an operation of writing performed by said input/output device on said file.

DESCRIPTION OF THE FIGURES

The device and the method object of the present invention will be hereinafter described with reference to the annexed figures wherein.

DETAILED DESCRIPTION OF THE INVENTION

Figure 1:
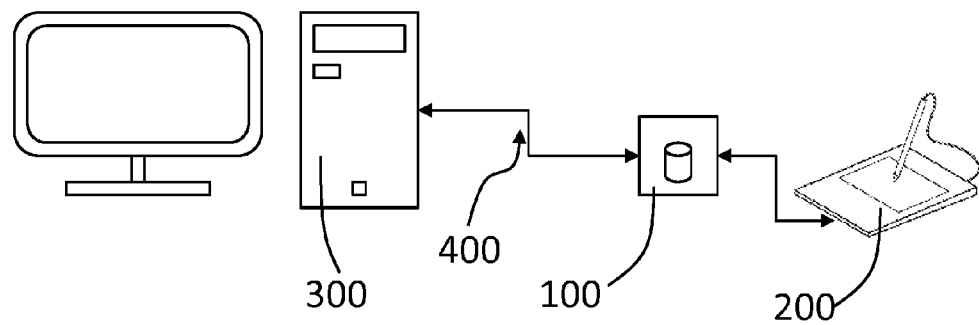
FIG. 1 shows a block scheme wherein it is present the device object of the present invention, interconnected between a personal computer and a device or input/output peripheral which is represented by a graphic tablet for the digital signature.

As it is schematically illustrated in FIG. 1, with the reference number 100 is shown in its entirety a device of interface between an input/output device 200 and an electronic computer 300. The purpose of the interface device is to allow the exchange of data and commands between the input/output device 200 and the electronic computer 300 without needing the installation of driver programs on the memory of the electronic computer 300 and therefore to allow to the same type of input/output device to operate on any electronic computer 300 independently of the operating system used form the same.

In detail, FIG. 1 shows a first alternative and non-limiting solution wherein the electronic computer is a personal computer, for example and in a non-limiting extent using a Windows® operating system and wherein the receiving/transmitting channel of the data and commands between the electronic computer and the input/output device is of a cabled type, therefore wherein data is exchanged on a data cable 400 as could it be for example and in a non-limiting extent a parallel cable, an USB3.0, or SCSI cable. The input/output device 200 in this case is a graphic tablet.

Figure 2:
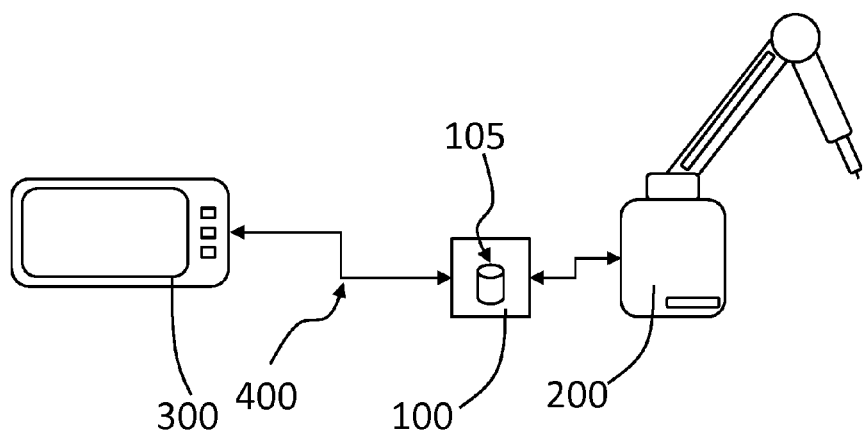
FIG. 2 shows a block scheme wherein it is present the device object of the present invention, interconnected between a tablet PC and a device or input/output peripheral which is represented by an industrial-type robot.

FIG. 2 shows instead an alternative solution wherein the electronic computer 300 is represented by a tablet PC, while the input/output device is an industrial robot. Those two figures therefore means that according to the present invention the electronic computer can be any electronic device provided with at least one microprocessor configurable for being capable of receiving/transmitting signals and/or data of command from an input/output device connected to the electronic computer itself), and therefore—in a non-exhaustive list—a personal computer, a tablet PC, a Mac-type computer, a mobile phone, a server, an industrial computer, a "specific purpose"-type microprocessor system.

The device 100 object of the present invention acts as a virtual disk 105 containing one or more memory areas wherein the electronic computer and the input/output device can write and/or read data and/or function commands without needing the installation of new drivers.

For convenience of technological realization, the virtual disk 105 is realized with a solid-state-type memory, like for instance a Flash or RAM memory.

Figure 3:
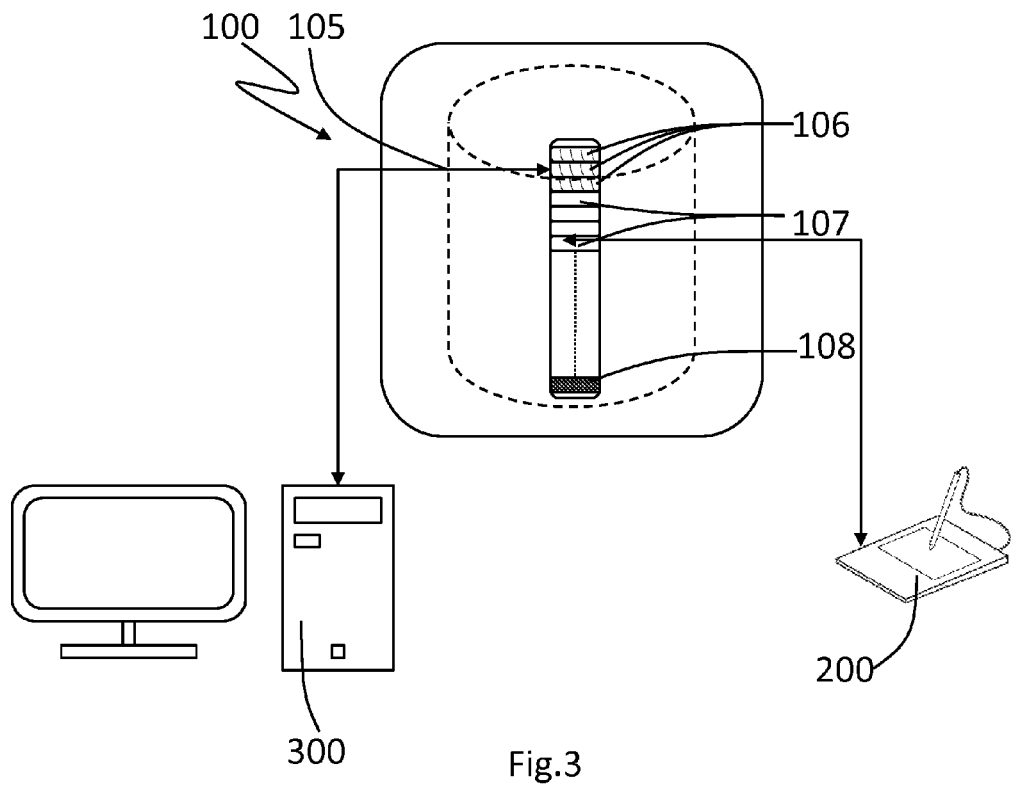
FIG. 3, FIG. 4 and FIG. 5 show respectively each one a detail of a first, second and third alternative embodiment of the internal structure of a file which is contained in the device object of the present invention.

In a first embodiment represented in FIG. 3, the device 100 object of the present invention presents a virtual disk 105 containing at least one file with a command/response interface structure. In said interface are present a first zone 106 for commands (represented by dashed boxes) and a second zone 107, different than the previous first zone 106, for the responses. More specifically, the first zone for commands is conceived for allowing the storage of those command data which are transmitted from the electronic computer 300 towards the input/output device 200, while the second zone 107 for responses is conceived for containing response data which are transmitted from the input/output device 200 towards the electronic computer. In detail, the responses that the input/output device 200 can provide are for example and non-limiting extent a first, and second and third response respectively of "received command", "executed command" and "refused command". A third area 108, which is represented by the black colored square, is an area for data.

If the command transmitted by the electronic computer 300 comprises also accessory data, like for example the rotation angle of an industrial robot arm, said command data will be written always in the first zone 106 of the virtual disk 105, and the second zone 107 will contain the response and for example time-variant data, that in the specific example can be represented by the actual angle that the industrial robot arm assumes with respect to the neutral position.

Figure 4:
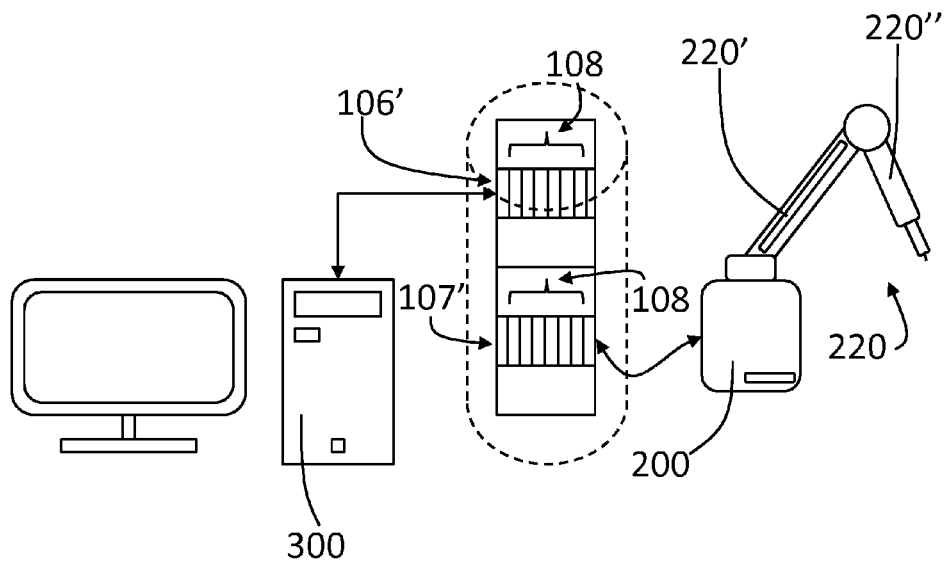

In a second alternative embodiment, the device 100 object of the present invention presents a virtual disk 105 containing at least one file provided with a bitmapped-type data interface. As it is illustrated in detail in FIG. 4, in the bitmapped interface are always present a first zone for commands 106' and a second zone 107' for responses, but these are structured in blocks of one or more byte 108 (therefore, 8 bits each), devoted respectively to parallel inputs for commands transmitted from the electronic computer towards the input/output device 200, this last being for example of an industrial type, and (second zone 107') to the restitution of the information about the execution of the commands read from the input/output device 200 in the first command zone 106'. In the example of FIG. 4, the device 100 is used for allowing the control of an industrial robot with a multiple-section arm, and the bytes of the first zone 106' are used for controlling in detail the first, second, sub-portion 220', 220", of the arm 220 of the robot that realizes the input/output device.

The advantage of using a bitmapped structure is that using more bits in one time it is possible to configure the virtual disk 105 as having input/output ports of a pseudo-analog type, thus wherein it is possible to transmit one or more command towards the input/output device that assume 256 values (or more, joining more bytes).

Figure 5:
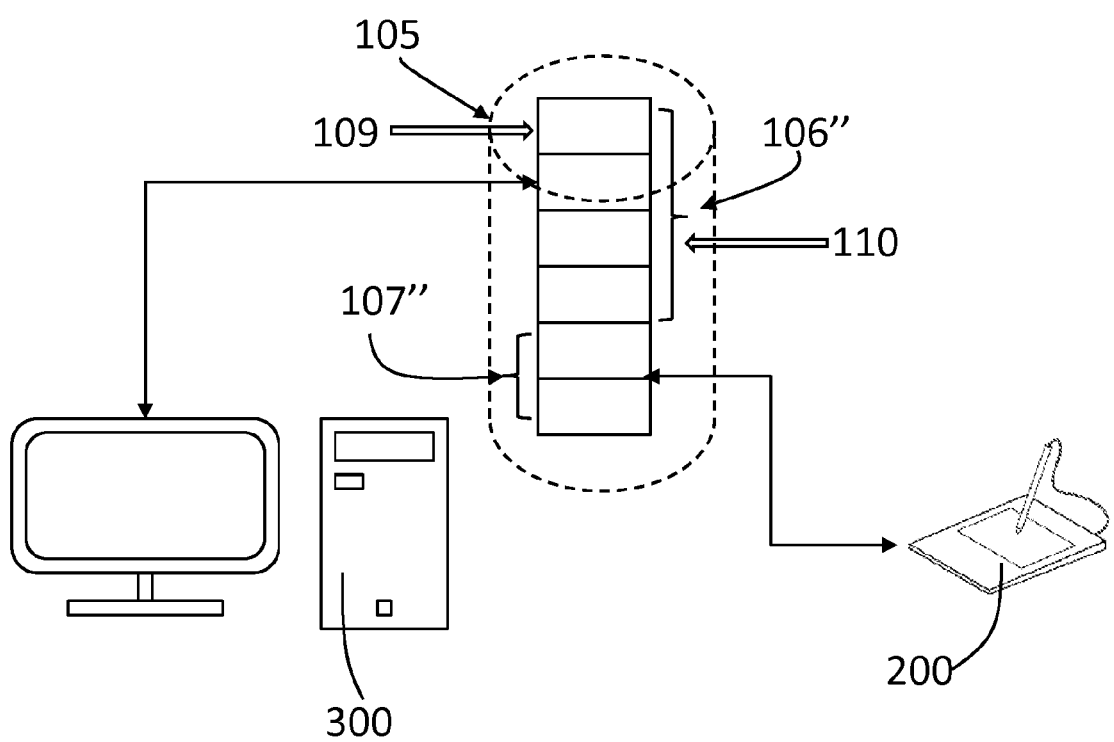

A third embodiment of the device which is object of the present invention is described in FIG. 5. In said third embodiment a FIFO interface is used, which is useful for all those cases wherein there is a continuous data or command flow, or more in general whenever there are data and/or commands which are transmitted respectively from the input/output device 200 and from the electronic computer 300 that is at least partially continued in time. The device that transmits the data or commands, therefore the electronic computer or the input/output device, writes respectively data or commands in a consecutive way on one or more bytes of the virtual disk, bytes that according to the provenience of the command assume—according to the present invention—features of the first zone for commands 106" or second zone 107" for data. When the writing is arrested, the device that has written the data or command, writes in an input pointer 109 the position of the last-written data or command. The device that instead read the data or commands previously written, in contrast, reads them starting from the position indicated by the output pointer 110, and increments its value at each reading, up to reaching the value of the input pointer 109.

The second zone 107" therefore acts as a temporary memory for data or commands transmitted from the originating device but not yet received by the addressee, and can have any size according to the need, since there are known methods for detecting situations of empty or full memory, and as well the reading and writing data and/or commands can take place on blocks of any size, starting from a single byte up to the maximum size which is technically more efficient that is the size of the virtual disk sector. The FIFO structure is particularly apt to realize the interface of serial communication like for example and in a non-limiting extent the RS 232, RS 485, Profibus, Modbus or other data/command bus of industrial type.

Since the device 100 object of the present invention is connected to the electronic computer 300, it is "seen" by the computer itself as a MSD protocol-based peripheral, being the MSD an acronym that stands for Mass Storage Device; hence, a device completely similar to a USB key, that by virtue of the protocol itself is managed by the electronic computer in a simple way, without needing special configurations or driver installations.

From a logic point of view, the virtual disk 105, preferably but not necessarily, compiles with FAT (File Allocation Table) standard, which is ruled by the ISO/IEC 9293 standard. The peculiar feature of the virtual disk 105 anyway resides in the physical structure of the disk itself. Through the FAT standard, the electronic computer can write, read and erase data on the virtual disk 105 as it they were simple memorization data in file, when instead those data are commands targeted to a peripheral that the electronic computer itself does not "see" directly.

The data area is realized through a file with a predefined name identifying the peripheral; for localizing the peripheral it is sufficient to search, among the mass memory devices which are present on the PC, the file with said predefined name; for starting the communication between said electronic computer 300 and the peripheral 200 the preselected file will be opened in a non-exclusive read/write mode. This implies that both the computer and the peripheral can write on the same file without having this last one being closed before being re-opened for performing the new writing, if this last one is performed by the other device.

The virtual disk 105 that is "seen" by the electronic computer 300 represents in reality only a part of the whole memory of the device object of the present invention. For fully understand the operation, is advisable to make a digression on the operation of a normal mass memory device as described immediately hereinafter.

Figure 6:
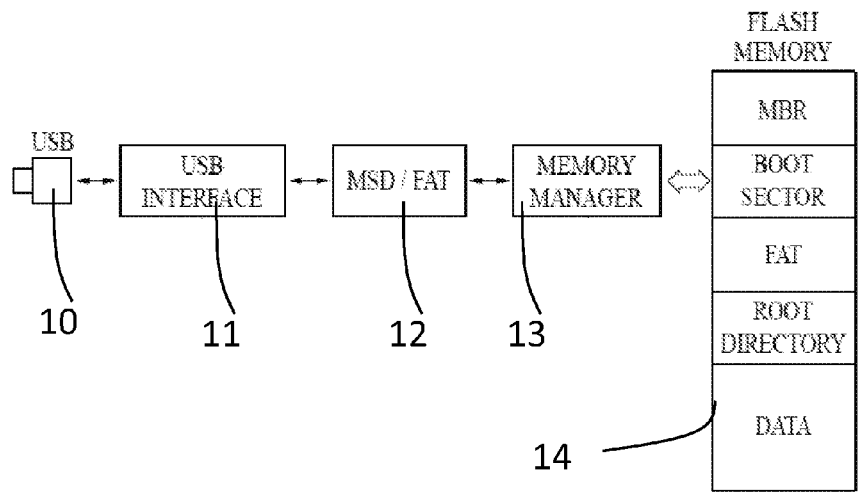
FIG. 6 shows a block scheme of a mass storage device of a known type.

As it is illustrated in FIG. 6, which shows a block scheme of a known type mass memory device, the USB connector 10 communicates with an interface block USB 11, which in turn communicates with the block that manages the MSD protocol 12 towards the electronic computer 300 and also realizes the file system that traditionally is of a FAT type, in the exemplification variants FAT12, FAT16 and FAT 32. The block of management of MSD protocol 12 communicates with a stage of management of the memory 13, which allows the exchange of data with the Flash memory 14, that contains all the structures of the file system FAT, named MBR, Boot Sector, FAT, Root Directory and at the end the memory that contains the real data, which is called DATA.

The USB interface block 11, the block of management of MSD protocol 12 can be realized totally as hardware or also be, completely or in part, realized through a microcontroller programmed with a specifically conceived firmware.

Figure 7:
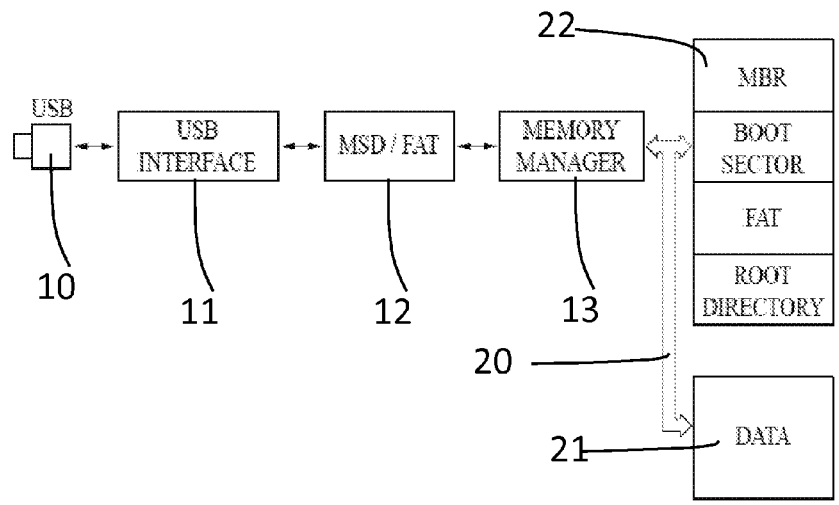
FIG. 7 shows a block scheme of the device which is object of the present invention.

On the other hand, in the solution that is object of the present invention, and which is illustrated in FIG. 7, the device object of the present invention comprises a USB connector 10, which allows for receiving/transmitting data and commands towards the USB interface block 11, which in turn communicates with a block of management of MSD protocol 12, this last being electrically connected with a management stage of the memory 13, which, through the data bus 20, exchanges data with two different areas of the flash memory. A first area 21, which is the area that contains data and command read and/or written by the electronic computer 300 and by the input/output device 200; said area is the one that the electronic computer 300 sees like a "virtual disk" 105. A second area 22, physically different than said first area 21, is the one that contains the sectors MBR, BOOT SECTOR, FAT and ROOT DIRECTORY, which are written once and for all in a ROM type memory; advantageously, therefore, each operation that implies a variation (yet accidental) has no consequence and the disk keeps always the same structure, the same index of files and the same allocation.

The solution proposed in FIG. 7 allows to obtain a device 100 which is more reliable in terms of integrity of operation and correct reception and transmission of data and commands from and towards the various input/output devices 200.

In fact, in the operating systems exists the possibility of modifying the file sizes on the disk, of erasing the file or of completely formatting the disk itself. The use of one of these functions, even accidental, in the area of the memory wherein the MBR sectors, the Boot Sector, the FAT and Root Directory are present, would have dramatic consequences on the operation of the aforementioned communication system, since the erasing of the file would leave the possibility of communication between the electronic computer 300 and the input/output device 200, while even only a variation in the data area size, during the operation, would compromise the synchronization between the receiving/transmitting function. The solution which is presented in FIG. 7 is immune from this defect thanks to the fact that the reading of sectors which are critical for data and command receiving/transmitting on a memory is only readable and not rewritable.

For reading data and commands it is preferable using a RAM instead of a Flash-type memory; in fact, the number of cycles of writing and erasing of the Flash memory with respect to a RAM memory is significantly lower, and exposes the device object of the present invention to risks of malfunction which are significantly higher than what could happen by using a RAM. The use of a Flash memory, whose number of erasing and rewriting data on a same cell is in the order of 100,000 or 1 million cycles, is substantially equivalent to the use of a RAM for all those application wherein the input/output device does not require a great amount of commands and does not respond many times; in contrast, and considering that exist input/output devices which are capable of requesting commands and write response also hundreds or thousands of times per second, it is preferable using precisely a RAM memory. Nonetheless, using a RAM memory provides for a writing, rewriting or reading of commands and data far faster that what people could obtain with a Flash memory.

Clearly in the course of the present invention have been defined structures wherein the communication for the exchange of data and commands between the electronic computer and the input/output device take place on a virtual disk with a single file. Anyway, said indication shall not be intended as limiting, since it is possible to use a solution wherein the virtual disk 105 has one or more files, or also—according to the complexity of the input/output device 200, and of hardware resources which are required from it for the complete management of admissible data and commands—also on more virtual disks 105, which can be easily created by the user through the electronic computer 300 due to the fact that the device according to the present invention interfaces as a mass memory device.

The device object of the present invention can therefore contain on one or more virtual disks 105 some files with specific names, names that in detail shall be known by the input/output device 200 in order to correctly dialogue with the electronic computer. Optionally, said files can be hidden to the sight of the user at the moment of the opening of the root directory of the virtual disk; in said case, said files are characterized by an hiding attribute. Always optionally, the virtual disk 105 can be rendered accessible only by using a password.

Preferably, finally, each file which is opened and shared between the electronic computer and the input/output device, is opened with a computer caching prevention attribute, so as to let the modifications provided to the file by the input/output device 200 are immediately "visible" by the computer, instead of rendering such modifications only visible at the moment of closure of finalization of writing of the file. This eases the rapid updating of commands and responses above yet defined.

The advantages of the device which is object of the present invention are clear in view of the preceding description: it allows for realizing a universal hardware interface, electrically connected between the electronic computer and the input/output peripheral that, independently from the type of computer or peripheral, let "see" that peripheral to the computer as it would be a normal mass memory; the fact that the mass memory is seen by the substantial totality of computers like a device which is capable of receiving and transmitting data without the installation of new drivers on the computer itself, since the drivers for managing of MSD-type peripherals are typically present on the vast majority of the today on market operating systems, allows to the fact that commands towards the peripheral can be written simply like data introduced in a memory, leaving to the device object of the present invention the task to let recognize said "data" as a command directed to the peripheral.

In other words, when the input/output device is electrically connected to the electronic computer 300, this last does not see the peripheral, but only a mass memory.

Advantageously, as already mentioned, where the reading and writing of data and commands use a RAM memory, it will be possible to write, read and overwrite data rapidly and without risking the collapse in the operation due to the sudden reaching of the limits in the life cycle of the memory in terms of number of reading or writing operations, also for all those applications that require a continuous and rapid updating of the commands which are transmitted to the input/output peripheral.

Furthermore, the use of a RAM memory specific for the application herein described allows for another advantage:

since in particular the memory is volatile, at each shutdown of the power source of the device object of the present invention, the content of the RAM will be lost. This is useful since in this way the risk of involuntarily activating commands deriving by a residual previous memorization at the moment of the startup or first connection of the device object of the present invention to the input/output device 200 is for sure cancelled. The also accidental deactivation of the device object of the present invention would only cause the loss of the commands or data not completely received or transmitted between the electronic computer and peripheral, without minimally mining the operation of the device 100 as a "driverless" interface for each type of peripheral. In fact, data which is necessary for the operation of the device object of the present invention are contained inside a ROM, that being non-volatile, is not influenced by the lack of power source and, nonetheless, cannot be forced in overwriting nor with intention.

Another advantage is that the application programs in the computer shall not recognize and communicate with plural peripheral drivers, each with a different type of communication: for detecting the peripheral it is sufficient to search a file with a predefined name and, for starting the communication, it is sufficient to open the file, exactly like it is done with for storing and reading data, a function which is available in all the languages and development environments.

Finally, advantageously through the device object of the present invention it can be avoided that the peripheral shall directly perform low level function calls on the operating system; this is advantageous since on one hand it simplifies the life of the programmer of the peripheral's firmware or of the input/output device, and secondarily since not all the operating systems accept calls to low level functions or subroutines without exceptions like at least and in a non-limiting extent system administrator privileges. The firmware of the peripherals is therefore developable also on those development environments wherein it is not possible at all to access to drivers which realize input/output functions.

It is finally clear that to the foregoing description can be provided modifications, additions or variants obvious for the technician expert in the art without departing from the scope of protection provided by the annexed claims.

The invention claimed is:

1. An electronic device (100) of interface between input and output peripherals (200) or devices and an electronic computer (300), the device being configured for allowing the receiving and transmission, including simultaneous receiving and transmission, of data and/or commands between at least an input and output peripheral (200) or device and at least an electronic computer (300), the electronic device (100) comprising:
    at least a memory (105) comprising a writable portion (21), on which writable portion (21) can be stored,
    i) at least one file which is shared with said input and output peripheral (200) or device, wherein said at least one file is assigned with a predetermined name, said predetermined name being known from said input and output peripheral (200) or device,
    ii) a plurality of commands to transmit from said electronic computer (300) to said input and output peripheral (200) or device, the commands being peripheral control commands, and
    iii) a plurality of data transmitted from said input and output peripheral (200) or device towards said electronic computer; and
    an interface susceptible to present to said electronic computer (300) at least one virtual disk (105) to and from which said electronic computer can respectively write and read data, said at least one virtual disk (105) containing said at least one file,
    wherein said electronic device (100) presents to said electronic computer (300) as a mass memory storage peripheral and is configured for allowing the interface of said at least one input and output peripheral (200) or device to said electronic computer (300) without needing a preventive installation of a specific software driver of said input and output peripheral (200) or device on said electronic computer (300), and
    wherein said input and output peripheral (200) or device is configured for searching said at least one file with said predetermined name at the moment or following connection with said electronic computer (300).

2. The device according to claim 1, further comprising:
    a second memory or memory portion (22) of a non-writable type, said second memory or memory portion (22) of a non-writable type being different than said first memory or than said first memory portion;
    said first memory or memory portion realizing a means susceptible of containing, in one or more files, said commands and/or said data which are transmitted from said input and output peripheral or device to said electronic computer;
    said second memory or memory portion comprising at least a mass storage device interface stage and a file allocation table management stage.

3. The device according to claim 2,
    wherein said first memory or memory portion corresponds to said at least one virtual disk (105).

4. The device according to claim 2, wherein said first memory is a Flash-type memory.

5. The device according to claim 2, wherein said first memory is a random access memory.

6. The device according to claim 1, wherein said at least one file is, in use, opened in sharing at least between said electronic computer (300) and said input and output peripheral (200) or device with a non-exclusive reading and writing mode susceptible of allowing at least reading of said at least one file by two different devices without preventive closure.

7. A method of interface between an electronic computer (300) and an input and output peripheral (200) or device; said method comprising:
    a step of interposition, on the communication channel which is created between said electronic computer (300) and said input and output peripheral (200) or device, at least an electronic interface device (100) comprising a virtual disk (105) in turn comprising at least a first memory or memory portion (21) in turn comprising a file which is accessible in writing both to said electronic computer (300) and to said input and output peripheral (200) or device,
    wherein at the moment or following the connection with said electronic computer (300), said electronic interface device (100) presents to said electronic computer (300) as a mass memory device;
    a step of writing at least a command for said input and output peripheral (200) or device on said first memory or first memory portion;
    a step of assigning a predetermined name to said at least one file, said predetermined name being known from said input and output peripheral (200) or device; and a step of searching performed by said input and output peripheral (200) or device of said file with said predetermined name at the moment or following the connection with said device (100).

8. A method of interface between an electronic computer (300) and an input and output peripheral (200) or device; said method comprising:
- a step of interposition, on the communication channel which is created between said electronic computer (300) and said input and output peripheral (200) or device, at least an electronic interface device (100) comprising a virtual disk (105) in turn comprising at least a first memory or memory portion (21) in turn comprising a file which is accessible in writing both to said electronic computer (300) and to said input and output peripheral (200) or device,
- wherein at the moment or following the connection with said electronic computer (300), said electronic interface device (100) presents to said electronic computer (300) as a mass memory device;
- a step of writing at least a command for said input and output peripheral (200) or device on said first memory or first memory portion; and
- opening of said at least one file without caching from said electronic computer (300); said opening of the file without caching from said electronic computer (300) causing an immediate updated representation of said file to said electronic computer (300) following a writing operation performed to said input and output peripheral (200) or device on said file.

9. A method of interface between an electronic computer (300) and an input and output peripheral (200) or device; said method comprising:
- a step of interposition, on the communication channel which is created between said electronic computer (300) and said input and output peripheral (200) or device, at least an electronic interface device (100) comprising a virtual disk (105) in turn comprising at least a first memory or memory portion (21) in turn comprising a file which is accessible in writing both to said electronic computer (300) and to said input and output peripheral (200) or device,
- wherein at the moment or following the connection with said electronic computer (300), said electronic interface device (100) presents to said electronic computer (300) as a mass memory device;
- a step of writing at least a command for said input and output peripheral (200) or device on said first memory or first memory portion;
- subdivision of said first memory or memory portion into a first area and a second area (106; 107) reciprocally separated and respectively targeted to at least temporarily store commands transmitted from said electronic computer (300) towards said input and output peripheral (200) or device and to at least temporarily store responses which are transmitted from said input and output peripheral (200) or device to said electronic computer (300); and
- assigning a predetermined name to said at least one file, said predetermined name being known from said input and output peripheral (200) or device; said method comprising a step of searching performed by said input and output peripheral (200) or device of said file with said predetermined name at the moment or following the connection with said device (100).

10. A method of interface between an electronic computer (300) and an input and output peripheral (200) or device; said method comprising:
- a step of interposition, on the communication channel which is created between said electronic computer (300) and said input and output peripheral (200) or device, at least an electronic interface device (100) comprising a virtual disk (105) in turn comprising at least a first memory or memory portion (21) in turn comprising a file which is accessible in writing both to said electronic computer (300) and to said input and output peripheral (200) or device,
- wherein at the moment or following the connection with said electronic computer (300), said electronic interface device (100) presents to said electronic computer (300) as a mass memory device;
- a step of writing at least a command for said input and output peripheral (200) or device on said first memory or first memory portion;
- subdivision of said first memory or memory portion into a first area and a second area (106; 107) reciprocally separated and respectively targeted to at least temporarily store commands transmitted from said electronic computer (300) towards said input and output peripheral (200) or device and to at least temporarily store responses which are transmitted from said input and output peripheral (200) or device to said electronic computer (300); and
- opening of said at least one file without caching from said electronic computer (300); said opening of the file without caching from said electronic computer (300) causing an immediate updated representation of said file to said electronic computer (300) following a writing operation performed to said input and output device on said file.

11. A method of interface between an electronic computer (300) and an input and output peripheral (200) or device; said method comprising:
- a step of interposition, on the communication channel which is created between said electronic computer (300) and said input and output peripheral (200) or device, at least an electronic interface device (100) comprising a virtual disk (105) in turn comprising at least a first memory or memory portion (21) in turn comprising a file which is accessible in writing both to said electronic computer (300) and to said input and output peripheral (200) or device,
- wherein at the moment or following the connection with said electronic computer (300), said electronic interface device (100) presents to said electronic computer (300) as a mass memory device;
- a step of writing at least a command for said input and output peripheral (200) or device on said first memory or first memory portion;
- a step of subdivision of said first memory or first memory portion into at least a first area (106') targeted to the reading of commands from said electronic computer (300) towards said input and output peripheral (200) or device and a second area (107') targeted to the reading of responses from said input and output peripheral (200) or device towards said electronic computer (300);
- a step of subdivision of said first area (106') into a plurality of bytes, each byte representing a plurality of parallel inputs and outputs for commands to be transmitted to said input and output peripheral (200) or device; and a step of assigning a predetermined name to said at least one file, said predetermined name being known from said input and output peripheral (200) or device; said method comprising a step of searching performed by said input and output peripheral (200) or device of said file with said predetermined name at the moment or following the connection with said device (100).

12. A method of interface between an electronic computer (300) and an input and output peripheral (200) or device; said method comprising:
- a step of interposition, on the communication channel which is created between said electronic computer (300) and said input and output peripheral (200) or device, at least an electronic interface device (100) comprising a virtual disk (105) in turn comprising at least a first memory or memory portion (21) in turn comprising a file which is accessible in writing both to said electronic computer (300) and to said input and output peripheral (200) or device,
- wherein at the moment or following the connection with said electronic computer (300), said electronic interface device (100) presents to said electronic computer (300) as a mass memory device;
- a step of writing at least a command for said input and output peripheral (200) or device on said first memory or first memory portion;
- a step of subdivision of said first memory or first memory portion into at least a first area (106') targeted to the reading of commands from said electronic computer (300) towards said input and output peripheral (200) or device and a second area (107') targeted to the reading of responses from said input and output peripheral (200) or device towards said electronic computer (300);
- a step of subdivision of said first area (106') into a plurality of bytes, each byte representing a plurality of parallel inputs and outputs for commands to be transmitted to said input and output peripheral (200) or device; and
- a step of opening of said at least one file without caching from said electronic computer (300); said opening of the file without caching from said electronic computer (300) causing an immediate updated representation of said file to said electronic computer (300) following a writing operation performed to said input and output device on said file.

13. The method according to claim 7, comprising a step of opening of said at least one file without caching from said electronic computer (300); said opening of the file without caching from said electronic computer (300) causing an immediate updated representation of said file to said electronic computer (300) following a writing operation performed to said input and output peripheral (200) or device on said file.

* * * * *